(12) United States Patent
Chuss et al.

(10) Patent No.: US 7,412,175 B2
(45) Date of Patent: Aug. 12, 2008

(54) INTERFEROMETRIC POLARIZATION CONTROL

(75) Inventors: David T. Chuss, Bowie, MD (US);
Edward J. Wollack, Clarksville, MD (US); Samuel H. Moseley, University Park, MD (US); Giles A. Novak, Evanston, IL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 162 days.

(21) Appl. No.: 11/425,352

(22) Filed: Jun. 20, 2006

(65) Prior Publication Data

US 2007/0146723 A1 Jun. 28, 2007

Related U.S. Application Data

(60) Provisional application No. 60/692,713, filed on Jun. 20, 2005.

(51) Int. Cl.
- G02F 1/00 (2006.01)
- H01Q 21/06 (2006.01)
- H01Q 21/24 (2006.01)
- H04B 7/10 (2006.01)
- H04B 10/06 (2006.01)

(52) U.S. Cl. .................. 398/204; 342/362; 398/1

(58) Field of Classification Search ................. 342/350, 342/361, 362; 343/756; 356/302, 364–370; 359/302, 191; 324/316; 398/1, 204
See application file for complete search history.

(56) References Cited

U.S. PATENT DOCUMENTS 3,881,105 A * 4/1975 De Lang et al. ............. 250/225

(Continued)

OTHER PUBLICATIONS

Lesurf adn Robertson, "mm-wave Spatial Interferometry As an Alternative to Radar for Coherent Point Sources," 1994 International Journal of Infared and Millimeter Waves, vol. 15, No. 11, pp. 1829-1839.*

(Continued)

*Primary Examiner*—Patrick Connolly
*Assistant Examiner*—Scott M Richey
(74) *Attorney, Agent, or Firm*—Heather Goo

(57) ABSTRACT

A signal conditioning module provides a polarimeter capability in a photometric system. The module may include multiple variable delay polarization modulators. Each modulator may include an input port, and a first arm formed to include a first reflector and first rooftop mirror arranged in opposed relationship. The first reflector may direct an input radiation signal to the first rooftop mirror. Each modulator also may include an output port and a second arm formed to include a second reflector and second rooftop mirror arranged in opposed relationship. The second reflector can guide a signal from the second rooftop mirror towards the output port to provide an output radiation signal. A beamsplitting grid may be placed between the first reflector and the first rooftop mirror, and also between the second reflector and the second rooftop mirror. A translation apparatus can provide adjustment relative to optical path length vis-a-vis the first arm, the second arm and the grid.

16 Claims, 6 Drawing Sheets

U.S. PATENT DOCUMENTS

| | | | | |
|---|---|---|---|---|
| 4,604,624 | A | * | 8/1986 | Amitay et al. ............... 342/361 |
| 4,973,163 | A | | 11/1990 | Sakai et al. |
| 4,998,255 | A | * | 3/1991 | Gerstenberger et al. ....... 372/28 |
| 5,090,803 | A | * | 2/1992 | Ames et al. ............ 356/139.03 |
| 5,117,239 | A | * | 5/1992 | Riza ........................... 342/375 |
| 5,187,487 | A | * | 2/1993 | Riza ........................... 342/372 |
| 5,329,118 | A | * | 7/1994 | Riza ...................... 250/227.12 |
| 5,796,506 | A | * | 8/1998 | Tsai ........................... 398/204 |
| 5,942,899 | A | * | 8/1999 | Shrekenhamer et al. ..... 324/326 |
| 6,101,015 | A | * | 8/2000 | Budil et al. ................. 324/316 |
| 6,188,481 | B1 | * | 2/2001 | Kumar ....................... 356/489 |
| 6,268,914 | B1 | | 7/2001 | Wang |
| 6,473,179 | B1 | | 10/2002 | Wang et al. |
| 6,473,181 | B1 | | 10/2002 | Oakberg |
| 6,658,212 | B1 | | 12/2003 | Trutna, Jr. et al. |
| 6,693,710 | B1 | | 2/2004 | Hoyt |
| 6,697,157 | B2 | | 2/2004 | Wang et al. |
| 6,765,672 | B1 | | 7/2004 | Veasey |
| 6,804,003 | B1 | | 10/2004 | Wang et al. |
| 6,806,963 | B1 | | 10/2004 | Walti et al. |
| 6,807,329 | B2 | * | 10/2004 | Zalevsky et al. .............. 385/16 |
| 6,816,261 | B2 | | 11/2004 | Patel et al. |
| 6,822,737 | B2 | | 11/2004 | Kurata et al. |
| 6,856,391 | B2 | | 2/2005 | Garab et al. |
| 7,018,745 | B2 | | 3/2006 | Stepanov et al. |
| 2003/0067602 | A1 | | 4/2003 | Patel et al. |
| 2003/0071995 | A1 | | 4/2003 | Kurata et al. |
| 2003/0124438 | A1 | | 7/2003 | Stepanov et al. |

OTHER PUBLICATIONS

D.H. Martin et al., "Polarised Interferometric Spectrometry for the Millimetre and Submillimetre Spectrum," Infrared Physics, Reprint 1970 pp. 136-141, vol. 10, Queen Mary College, London.

R.H. Hildebrand et al., "A Primer on Far-Infrared Polarimetry," The Astronomical Society of the Pacific, Sep. 2000, pp. 1215-1235, Publications of the Astronomical Society of the Pacific, USA.

E.S. Battistelli et al., "Far Infrared Polarimeter With Low Instrumental Polarization", Sep. 10, 2002, pp.

S. Pancharatnam, "Achromatic Combinations of Birefringent Plates", Memoir No. 71 of the Roman Research Institute, Part 1. An Achromatic Circular Polarizer, Mar. 5, 1955, pp. 130-136, Bangalore.

Brosseau, "Optical Polarizing Components", Fundamentals of Polarized Light, Section 5.2, pp. 330-338.

Goldsmith, "Polarization Transducers and Wave Plates", Quasioptical System, Section 8.4, pp. 197-203.

David E. Budil et al., "Jones Matrix Formalism for Quasioptical EPR", Journal of Magnetic Resonance, Jan. 10, 2000, pp. 20-34, Academic Press.

G. Siringo et al., "A new polarimeter for (sub)millimeter bolometer arrays", Astronomy & Astrophysics, Apr. 1, 2004, pp. 751-760.

Martin Houde et al., "Polarizing Grids, Their Assemblies, and Beams of Radiation," The Astronomical Society of the Pacific, May 2001, pp. 622-638, Publications of the Astronomical Society of the Pacific, USA.

Takeshi Manabe et al., "Transmission and Reflection Characteristics of Slightly Irregular Wire-Grids for Arbitrary Angles of Incidence and Grid Rotation," Apr. 21-24, 2003, pp. 1-10, 14th International Symposium on Space TeraHertz Technology.

D.H. Martin, "Polarizing (Martin-Puplett) Interferometric Spectrometers for the Near and Submillimeter Spectra," Infrared and Millimeter Waves, 1982, pp. 65-147, vol. 6, Academic Press.

Tinbergen, "Instruments: Implementations," Optical/Infared Systems, pp. 92-125, vol. 6.1, Astronomical Polarimetry.

David T. Chuss, et al., "A Martin-Puplett Architecture for Polarization Modulation and Calibration," pp. 9-40.

* cited by examiner

INTERFEROMETRIC POLARIZATION CONTROL

RELATED APPLICATIONS

This application claims the benefit of U.S. Provisional Application Ser. No. 60/692,713, filed on Jun. 20, 2005, under 35 U.S.C. §119(e).

ORIGIN OF THE INVENTION

The invention described herein was made by one or more employees of the United States Government and may be manufactured and used by or for the Government of the United States of America for governmental purposes without the payment of any royalties thereon or therefor.

FIELD OF THE DISCLOSURE

This disclosure relates generally to measurement apparatus, modeling and techniques for polarization characterization or measurement of signals, in particular to a quasioptical phase modulator for polarization control and modulation, and more particularly, to techniques and apparatus for variable delay polarization modulation.

BACKGROUND

Astronomical polarimetry is an area currently undergoing much study and development, at least in part responsive to high-sensitivity searches for "B-modes" of the cosmic microwave background radiation polarization.

The cosmic microwave background is polarized at the level of a few microkelvins. There are two types of polarization, respectively known as E-modes and B-modes. The relationship between these modes may be analogous to electrostatics, in which the electric field (E-field) has a vanishing curl and the magnetic field (B-field) has a vanishing divergence. The E-modes arise naturally from Thomson scattering in an inhomogeneous plasma. The B-modes, which are thought to have an amplitude/magnitude of at most a 0.1 µK, are not produced from plasma physics alone.

Detecting the B-modes is extremely difficult, particularly given that the degree of foreground contamination is unknown, and the weak gravitational lensing signal mixes the relatively strong E-mode signal with the B-mode signal.

B-modes are signals resulting from cosmic inflation and are determined by the density of primordial gravitational waves. B-modes thus provide signatures for gravitational waves associated with the inflationary epoch and are expected to provide a direct measurement of the energy scale of inflation. Amplitudes for B-modes are theorized to be on the order of $10^{-7}$ to $10^{-9}$ of that of the cosmic background radiation, and thus measurement of the B-modes requires a robust modulation strategy and effective control over systematic artifacts.

Emission from magnetically-aligned dust in our Galaxy contributes to interference that will have to be understood in order to clearly distinguish and extract the B-mode from the total signal. However, this polarized emission also provides a tool for analyzing the role of magnetic fields in star formation. The advent of multiple wavelength submillimeter and far-infrared photometers, such as SCUBA2 (a new generation submillimeter imager for the James Clerk Maxwell Telescope) and HAWC (a far-infrared camera for the Stratospheric Observatory For Infrared Astronomy (SOFIA)), provides opportunity to expand such study. Polarization modules have been developed to facilitate leveraging of these new photometric tools for such applications by allowing them to function as polarimeters.

Partial polarization results from statistical correlation between the electric field components in the plane perpendicular to the propagation direction. Such correlation is represented via complex quantities, and, as a result, in measurements of polarized light, it is convenient to employ linear combinations of these correlations, such as Stokes parameters, e.g., I, Q, U and V.

The polarization state of radiation through an optical system may be modeled by determining the transformations that describe the mapping of the input to the output polarization states. In modeling the types of optical elements associated with the polarization modules described in this disclosure, Stokes I is decoupled from the other Stokes parameters. For this class of elements, the polarization P, as described with reference to Eq. (1) below, $$P^2 = Q^2 + U^2 + V^2, \qquad (1)$$

is constant. Eq. (1) may be interpreted to describe the points on the surface of a sphere in three-dimensional space having Q, U and V as coordinate axes. This sphere is known as the Poincaré sphere, and the action of any given ideal polarization modulator may be described by a rotation and/or an inversion in this space. Such operations correspond to introduction of a phase delay between orthogonal polarizations, and that is the physical mechanism operative in a polarization modulator. The two degrees of freedom of any given transformation are the magnitude of the introduced phase delay and a parameter describing the basis used to define the phase delay. These two parameters directly define the orientation and the magnitude of the rotation on the Poincaré sphere: the rotation axis is defined by the sphere diameter connecting the two polarization states between which the phase is introduced, and the magnitude of the rotation is equal to that of the introduced phase.

In order to measure the polarized part of a partially-polarized signal, it is useful to separate the polarized portion of the signal from the unpolarized portion. This is especially useful when the fractional polarization is small. One way to do this is to methodically change, or modulate, the polarized portion of the signal (by changing one of the parameters of the polarization modulator) while leaving the unpolarized portion unaffected. Periodic transformations in Poincaré space can accomplish this encoding of the polarized portion of the signal for subsequent demodulation and detection. A convenient way of formulating the problem is to envision a detector that is sensitive to Stokes Q when projected onto the sky in the absence of modulation. The polarization modulator is then systematically changing the polarization state to which the detector is sensitive. By measuring the output signal, the polarization state of the signal or light may be completely characterized.

One conventional way to implement such a polarization modulator is by use of a dielectric birefringent plate. A birefringent plate comprises a piece of birefringent material cut so as to delay one linear polarization component relative to the other by the desired amount (generally either one-half or on quarter of the wavelength of interest). In this case, the phase difference is fixed, and the modulation is accomplished by physically rotating the birefringent plate (and hence the basis of the introduced phase).

However, a birefringent plate may be built to measure either circular or linear polarization, but cannot measure both. Additionally, polarization modulators built using this approach are not readily retuned for use at multiple wavelengths. Further, the requirement to be able to rotate the birefringent plate engenders need for a complex ensemble of shafts, bearings and gears.

For the reasons stated above, and for other reasons discussed below, which will become apparent to those skilled in the art upon reading and understanding the present disclosure, there are needs in the art to provide improved phase modulators in support of increasingly stringent and exacting performance and measurement standards in settings such as astronomical observation.

SUMMARY

The above-mentioned shortcomings, disadvantages and problems are addressed herein, which will be understood by reading and studying the following disclosure.

In one aspect, the disclosure encompasses a signal conditioning module configured for insertion into a photometric system to realize a polarimeter. The module may include a cascaded series of variable delay polarization modulators. Each modulator of the series includes may include an input port, and a first arm formed to include a first reflector and first rooftop mirror arranged in opposed relationship. The first reflector can direct an input radiation signal from the input port towards the first rooftop mirror. Each modulator may also include an output port and a second arm formed to include a second reflector and second rooftop mirror arranged in opposed relationship. The second reflector can guide a signal from the second rooftop mirror towards the output port to provide an output radiation signal. A beamsplitting grid may be placed between the first reflector and the first rooftop mirror, and may also be placed between the second reflector and the second rooftop mirror. A translation apparatus can provide adjustment relative optical path length vis-a-vis the first arm, the second arm and the grid.

In another aspect, a millimeter wave receiver may include an input antenna, and a polarization modulation chain coupled to the input antenna. The modulation chain can include multiple cascaded variable-delay polarization modulators, each having an input realizing a fixed basis of phase introduction, and a translation apparatus providing variable magnitude of phase delay between two orthogonal linear polarizations of an input signal. The modulation chain may further include a beamsplitter, a first arm and a second arm optically coupled to one another via the beamsplitter. Each of the first and second arms may include opposed reflective elements disposed on opposite sides of the beamsplitter. The opposed reflective elements in each arm may have at least one mirror coupled to the translation apparatus such that a first distance separating the beamsplitter from at least one of the opposed reflective elements is variable.

In a further aspect, the present disclosure contemplates a radio telescope, which may comprise an antenna and a receiver coupled to the antenna. The receiver can provide a polarizing interferometer function by including a polarization modulation chain coupled to the antenna and comprising multiple cascaded variable-delay polarization modulators, each of which may include a translation apparatus providing variable magnitude of phase delay between two orthogonal linear polarizations of an input signal, a beamsplitter and a first arm and a second arm optically coupled to one another via the beamsplitter. Each of the first and second arms may be formed of opposed reflective elements disposed on opposite sides of the beamsplitter, each of which may include at least one mirror coupled to the translation apparatus such that a first distance separating the beamsplitter from at least one of the opposed reflective elements is variable.

DETAILED DESCRIPTION

In the following detailed description, reference is made to the accompanying drawings that form a part hereof, and in which are shown, by way of illustration, specific embodiments which may be practiced. These embodiments are described in sufficient detail to enable those skilled in the art to practice the embodiments, and it is to be understood that other embodiments may be utilized, and that logical, mechanical, electrical and other changes may be made, without departing from the scope of the embodiments.

Ranges of parameter values described herein are understood to include all subranges falling therewithin. The following detailed description is, therefore, not to be taken in a limiting sense.

The detailed description is divided into five sections. In the first section, a system level overview is provided. In the second section, a physical example of a variable-delay polarization modulator element is presented. In the third section, tools for modeling variable-delay polarization modulator elements are developed. In the fourth section, hardware and an operating environment in conjunction with which embodiments may be practiced are described. In the fifth section, a conclusion of the detailed description is provided. A technical effect of the systems and processes disclosed herein includes at least one of facilitating capability for measurement of polarization components of millimeter-wave or quasi-optical signals.

§I. System Overview

Figure 1:
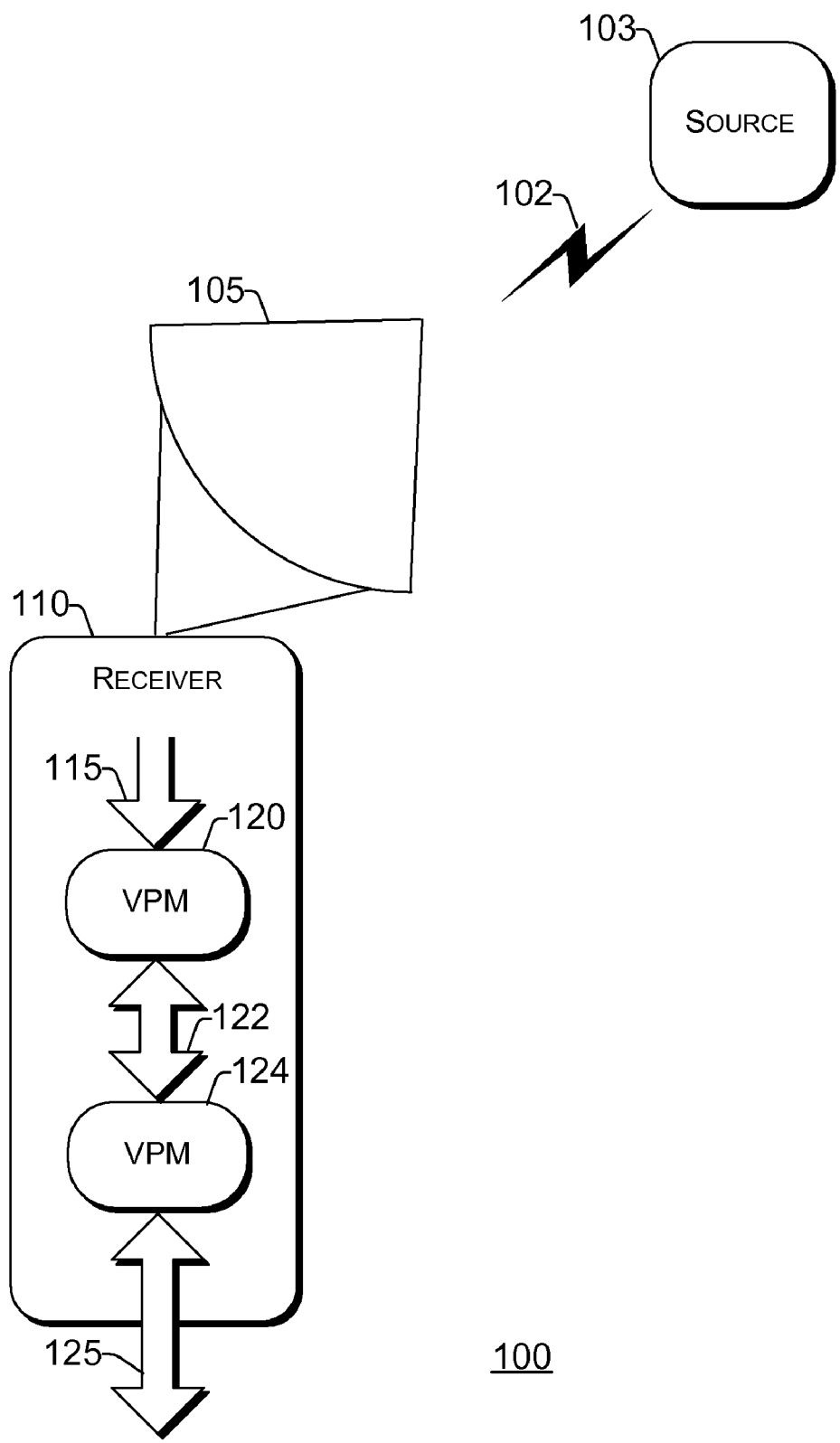
FIG. 1 is a simplified block diagram of an overview of a system configured to improve quasi-optical signal detection operations according to an embodiment of the invention.

FIG. 1 is a simplified diagram of an overview of a modified system 100 configured to improve quasi-optical signal detection operations. The system 100 may receive a signal 102 from a source 103 via one or more antennae 105 (only one antenna is shown in FIG. 1), which may be parabolic, or may be any other type of antenna suitable for the wavelength of interest. A receiver 110 can be coupled to the antenna 105 and can provide received signals 102 via a signal port 115 to a first variable-delay polarization modulator element VPM 120, which may be coupled via signal path 122 to a second variable-delay polarization modulator element VPM 124, which, in turn, can pass the modulated signal on to other receiver elements (not shown in FIG. 1) via an output port 125.

It will be appreciated that while two variable-delay polarization modulator elements VPM 120, 124 are shown coupled in cascade in FIG. 1, additional variable-delay polarization modulator elements. In one embodiment, the system 100 may be included in the receiver 110. As well, one or more of the variable-delay polarization modulator elements may integrate into the system 100 in other ways, such as forming a portion of the antenna 105, or as coupling the antenna 105 to the receiver 110. Also, it will be appreciated that the receiver 110 may be employed in capacities not associated with a signal reception system per se. For example, the cascaded variable-delay polarization modulator elements VPM 120, 124 may be employed as a portion of a calibration apparatus or for other purposes.

In one embodiment, the system 100 may be a radio reception system configured to detect modulation present on a radio signal 102. Such modulation may result from a variety of sources, including man-made sources or naturally-occurring objects and associated phenomena. In other words, modulation present on the signals 102 may represent any of a variety of phenomena, including communications-related activities, remote sensing applications, naturally-occurring objects and associated phenomena and other scenarios wherein detection of such modulation is desirable. In one embodiment, the system 100 may be at least a portion of an astronomical instrument, such as a radio telescope, that may be employed for purposes of cosmology or other study.

The variable-delay polarization modulator elements 120 may stand in contrast to the conventional birefringent modulators in that the basis of phase introduction can be held fixed, but the magnitude of the delay may be variable. As a result, a variable-delay polarization modulator element 120 may provide an adjustable delay between two orthogonal linear polarizations of an electromagnetic wave comprising the signal 102. There are many known elements in the art capable of providing such variable delay. For example, a Martin-Puplett interferometer that does not include an input polarizer has been described in the past.

In this invention, the polarization modulation can be explicitly separated from the polarized detection (obtained via an analyzer) of the signal 102. One advantage realized by this treatment may be that the basis of the variable-delay polarization modulator can be rotated at an arbitrary angle with respect to the analyzer.

§II. Variable-Delay Polarization Modulator Elements

Figure 2:
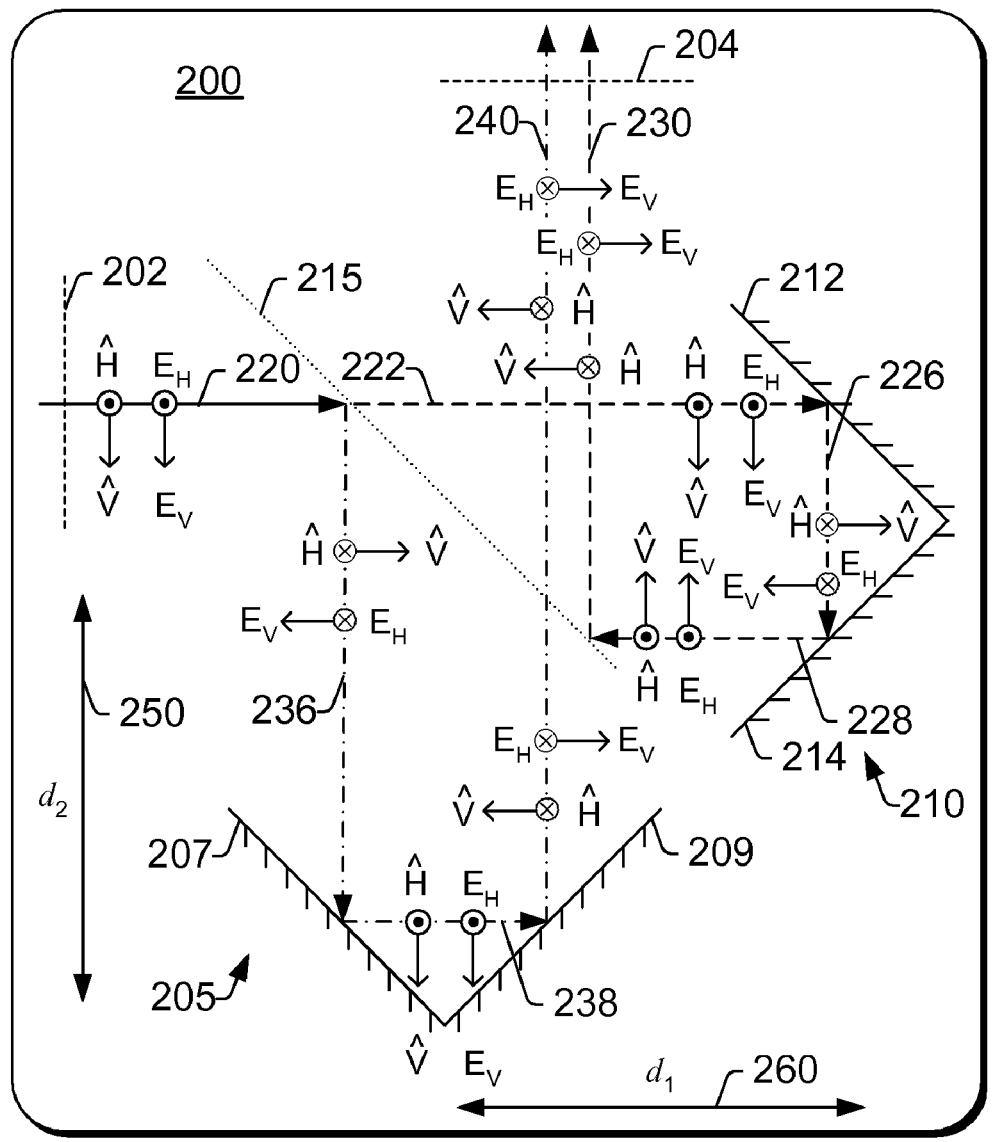
FIG. 2 is a simplified representation of a variable-delay polarization modulator element useful in the context of the system of FIG. 1 according to an embodiment.

FIG. 2 shows a simplified schematic diagram of a variable-delay polarization modulator 200 of a Martin-Puplett interferometer, i.e., an n=1 case, for an angle of $\pi/4$. The variable-delay polarization modulator 200 may include an input port 202, and output port 204, a first rooftop mirror 205 comprising a first planar reflective surface 207 and a second planar reflective surface 209 at right angles to one another, a second rooftop mirror 210 comprising a first planar reflective surface 212 and a second planar reflective surface 214 also at right angles to one another and a wire grid 215 acting as a beam-splitting reflector and as a polarizing filter interposed between the first 205 and second 210 rooftop mirrors. When $d_1=d_2$, the modulator 200 may behave as a mirror; when there is a path difference, it can change the polarization state of the incoming radiation 220.

An incoming light beam 220 can enter through the input port 202 and then be incident on the grid 215. A portion 222 of the beam may be transmitted through the grid 215 and may strike the first planar reflective surface 212 of the second rooftop mirror 210, giving rise to a first reflected beam 226 that may strike the second planar reflective surface 214 of the second rooftop mirror 210 and in turn gives rise to a second reflected beam 228 that may travel parallel to the transmitted beam portion 222, but in the opposite direction. The second reflected beam 228 may strike the grid 215, giving rise to a third reflected portion 230 that may travel parallel to the first reflected beam 226, but in the opposite direction, to the output port 204.

Another portion of the incoming light beam 220 may be reflected by the grid 215, giving rise to a first reflected beam 236 that can strike the first planar surface 207 of the first rooftop mirror 205, thus resulting in a second reflected beam 238 that can strike the second planar surface of the first rooftop mirror 205, and in turn giving rise to a third reflected beam 240 traveling in the opposite direction. According to the example of an embodiment shown in FIG. 2, radiation may enter from the left (arrow 220), and may be split by a beam-splitting grid 215 into beams 222 and 236. These two components of polarization may then be directed to a respective one of rooftop mirrors 205 and 210, which can rotate the polarization by ninety degrees with respect to the wires forming the beam-splitting grid 215.

Beams 230 and 240 can recombine at the beam-splitting grid 215 and may exit towards the top of the variable-delay polarization modulator 200. In the following analysis, the angle of the variable-delay polarization modulator 200 corresponds to the angle of the beam-splitting grid 215. However, one skilled in the art will recognize that other possibilities exist that may fall within the scope of this invention.

The variable-delay polarization modulators 200 can be configured as follows: the variable-delay polarization modulator closest to the polarization-sensitive detector, i.e., variable-delay polarization modulator$_1$, may have its beam-splitting grid 215 oriented at forty-five degrees with respect to the axis of the detector (Q axis), and the second variable-delay polarization modulator, i.e., variable-delay polarization modulator$_2$, may have its grid 215 oriented at an angle of twenty-two and a half degrees (i.e., $\pi/8$) with respect to the detector axes. Full modulation of all linear and circular polarizations states can be achieved with this configuration. Employing this architecture in a polarimeter that measures linear polarization may be modeled as described below. Denoting a first variable-delay polarization modulator, i.e., variable-delay polarization modulator$_1$, which may be an input variable-delay polarization modulator and thus near the signal source, as having zero phase delay, and then switching a second variable-delay polarization modulator, i.e., variable-delay polarization modulator$_2$, between delays of 0 and $\pi$, then the detector axes, projected onto the plane of the sky, can switch between Q and –Q. With variable-delay polarization modulator$_1$ set to a phase delay of $\pi$, switching variable-delay polarization modulator$_2$ between 0 and $\pi$ can project the detector axes to ±U. The dual variable-delay polarization modulators can provide two degrees of freedom, namely, the phase delay of each. The angles chosen for the two basis sets may be those for which the two degrees of freedom correspond to orthogonal coordinates on the Poincaré sphere, thus allowing all polarization states to be accessible to the detector.

Qualities providing utility for this architecture as a candidate technology for polarimeters in far-infrared through millimeter regions of the spectrum for astronomical observation applications may include: (i) this approach may allow implementations that are able to the first reflected beam 236 and parallel to it. The third reflected beam 240 combines with the third reflected beam portion 230 and the combined beams 230 and 240 exit towards the top of the variable-delay polarization modulator 200.

The polarizations of the electric E and magnetic H components of the various beam portions can be as noted in FIG. 2, and the rooftop mirrors 205 and 210 can act to rotate the polarization by ninety degrees with respect to the wires forming the beam-splitting grid 215. The path length of either the arm of the modulator 200 including the first rooftop mirror 205 or the second rooftop mirror 210 may be modified, for example by translating the first rooftop mirror 205 parallel to the path noted by the arrow 250, resulting in modulation of relative phase of the third reflected beam 240 relative to the third reflected beam portion 230 by changing the path length $d_1$, or by translating the second rooftop mirror 210 parallel to the arrow 260, again resulting in controlled modulation of the relative phases of the third reflected beam portion 230 relative to the third reflected beam 240 by changing the path length $d_2$. In either case, the third reflected beam portion 230 and the third reflected beam 240 may combine to provide either constructive or destructive interference varying with the relative path length modulation of $d_1-d_2$. When $d_1=d_2$, the modulator 200 behaves as a mirror; when there is a path difference, the polarization state of the incoming radiation 220 is modified as described infra.

Figure 3:
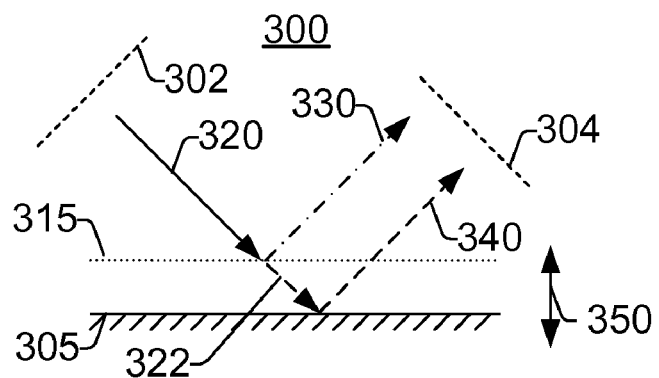
FIG. 3 is a simplified representation of a variable-delay polarization modulator element useful in the context of the system of FIG. 1 according to an embodiment.

FIG. 3 is a simplified representation of a variable-delay polarization modulator element 300 useful in the context of the embodiment of FIG. 1. The variable-delay polarization modulator element 300 may include an input port 302, an output port 304, a mirror 305 and a polarizing wire grid 315 that also acts as a partially reflective surface or beam splitter. An input signal 320 (solid line and arrow) may enter via the input port 302 and strike the grid 315, giving rise to a partially transmitted portion 322 (dashed line and arrow) and a partially reflected beam portion 330 (dot-dash line and arrow). The partially transmitted beam portion 322 may be incident on and reflected by the mirror 305, resulting in a reflected beam 340, at least a portion of which may traverse back through the grid 315 parallel to the reflected beam portion 330 and which may combine with the reflected beam portion 330 at the output port 304. Motion of the mirror 305 relative to the grid 315 or vice-versa may result in a variable path length difference for the beam portions 330 and 340, again giving rise to modulated constructive or destructive interference, as described above.

In the following analysis, the angle of the variable-delay polarization modulator 200 may correspond to the angle of the beam-splitting grid 215. In contexts such as the receiver 110 of FIG. 1, where multiple variable-delay polarization modulators 200 are coupled in cascade, the variable-delay polarization modulators 200 may be configured as follows: the variable-delay polarization modulator 200 closest to the polarization-sensitive detector, i.e., variable-delay polarization modulator$_1$, may have its beam-splitting grid 215 oriented at forty-five degrees with respect to the axis of the detector (Q axis), and the second variable-delay polarization modulator 200, i.e., variable-delay polarization modulator$_2$, may have its grid 215 oriented at an angle of twenty-two and a half degrees (i.e., $\pi/8$) with respect to the detector axes. Full modulation of all linear and circular polarizations states can be achieved with this configuration. Employing this architecture in a polarimeter that measures linear polarization may be modeled as described below. Denoting a first variable-delay polarization modulator, i.e., variable-delay polarization modulator$_1$, which is an input variable-delay polarization modulator and thus near the signal source, as having zero phase delay, and then switching a second variable-delay polarization modulator, i.e., variable-delay polarization modulator$_2$, between delays of 0 and $\pi$, then the detector axes, projected onto the plane of the sky, will switch between Q and −Q. With variable-delay polarization modulator$_1$ set to a phase delay of $\pi$, switching variable-delay polarization modulator$_2$ between 0 and $\pi$ projects the detector axes to ±U. The dual variable-delay polarization modulators may provide two degrees of freedom, namely, the phase delay of each. The angles chosen for the two basis sets may be those for which the two degrees of freedom correspond to orthogonal coordinates on the Poincaré sphere, thus allowing all polarization states to be accessible to the detector.

Qualities providing utility for this architecture as a candidate technology for polarimeters in far-infrared through millimeter regions of the spectrum for astronomical observation applications include: (i) this approach allows implementations that are able to cover the full Poincaré sphere, in contrast to birefringent plates, which can assess either linear or circular polarization, but not both; (ii) the variability of the path difference between orthogonal polarization states may facilitate retuning for use at multiple wavelengths; (iii) frequency-dependent antireflective coatings can be avoided, in contrast to approaches relying on transmission through thick dielectric plates; (iv) the complexities of shafts, bearings and gears to rotate the birefringent plate in modulators based on such plates can be avoided. Each of these qualities may present a benefit in the context of measuring polarized flux of astronomical and cosmological sources from space-borne observation platforms.

The variable-delay polarization modulator in a Martin-Puplett interferometer is a specific example of more general cases. The Martin-Puplett interferometer is configured with the relative angle of the variable-delay polarization modulator at forty-five degrees with respect to the analyzer. The analytical expressions for the polarization components in this case may follow from those for the case of the single variable-delay polarization modulator placed at an arbitrary angle, although the physical implementation is different.

The development and disclosure of aspects of expressions for the transfer function for multiple variable-delay polarization modulator elements in cascade at arbitrary relative orientations may proceed from an example of two such elements, as described in more detail below. Within that context, initially developing an expression for the transfer function for a single variable-delay polarization modulator then later may facilitate modeling of multiple cascaded variable-delay polarization modulators having arbitrary relative orientations. The discussion that follows assumes that the modulation passband is sufficiently narrow that the phase delays introduced at the center wavelength approximately apply over the whole bandwidth.

§III. Modeling Variable-Delay Polarization Modulator Elements

A Mueller matrix representation (e.g., Eqs. (2) through (10) and Table I, infra) of the variable-delay polarization modulator 200, according to an embodiment, is now developed in §III(a), based on consideration of the interior portion of a Martin-Puplett interferometer. Via this representation, which is given strictly by way of example and is therefore not limiting, the frequency-dependent performance of a variable-delay polarization modulator can be modeled in §III(b) (e.g., Eqs. (11) through (16), infra). An alternative embodiment of architecture for the variable-delay polarization modulator is described in §III(c), and systematics are considered in §III(d). Experimental results from laboratory tests of a single variable-delay polarization modulator are then presented in §III(e) (and Eq. 17), and those empirical results are compared in §III(f) to simulations based on the transfer function models developed and disclosed herein (FIGS. 5 through 9). In §III(g), polarization matrix methods are described (e.g., Eqs. 18 through 24 and Table II, infra). A summary of these aspects is provided in §III(h).

A Martin-Puplett interferometer includes a variable-delay polarization modulator with an analyzer on the output end nominally oriented at an angle of forty-five degrees with respect to the beam-splitting grid 215. For spectrometer applications, one of the ports on the input side is shorted by a grid 215 oriented either parallel or perpendicular to the analyzer (a grid 215 may have functionality other than beamsplitting). The model developed below of the interior of the Martin-Puplett interferometer in terms of Jones and Mueller matrices allows a general variable-delay polarization modulator to be described at an arbitrary angle with respect to the optical system within which it is operative. The convenience of use of standard polarization matrices facilitates modeling of multiple variable-delay polarization modulators cascaded serially.

matrices for the radiation in each of the arms of the variable-delay polarization modulator 200, that is:

$$\bar{J}_{VPM}(\pi/4) = \bar{J}_{VPM}^{(1)}(\pi/4) + \bar{J}_{VPM}^{(2)}(\pi/4). \tag{2}$$

In turn, each of the terms can be decomposed into a product of the Jones matrices of the elements in each optical path, for example, using the Jones matrices given below in Table I. A result of decomposing the terms of Eq. (2) as described is shown below in Eqs. (3) and (4):

$$\bar{J}_{VPM}^{(1)}(\pi/4) = \bar{J}_{WT}(\pi/4)\bar{J}_z(d_1)\bar{J}_{RT}(0)\bar{J}_z(d_1)\bar{J}_{WR}(\pi/4) = \tag{3}$$

$$\begin{pmatrix} 1 & 1 \\ -1 & -1 \end{pmatrix} \frac{\exp(i4\pi d_1/\lambda)}{2},$$

and $$\bar{J}_{VPM}^{(2)}(\pi/4) = \tag{4}$$

$$\bar{J}_{WR}(\pi/4)\bar{J}_z(d_2)\bar{J}_{RT}(0)\bar{J}_z(d_2)\bar{J}_{WT}(\pi/4) = \begin{pmatrix} 1 & -1 \\ 1 & -1 \end{pmatrix} \frac{\exp(i4\pi d_1/\lambda)}{2}.$$

TABLE I

Summary of physical transformation models for optical elements, including Jones matrices. For linear distance transformation, d represents distance traveled; for the mirror, rotation has no effect; for the wire grid, θ represents the angle of the grid wires with respect to the H-axis; for the rooftop mirror, θ respresent the angle of the between the roofline and the H-axis; for the birefringent plate, θ represents the angle between the fast axis of birefringence and the H-axis. and ξ is half of the phase delay introduced between the orthogonal polarizations.

| Description | Symbol | Jones matrix | Stokes Expansion |
|---|---|---|---|
| Linear distance | $\bar{J}_z(d)$ | $\begin{pmatrix} \exp(i2\pi d/\lambda) & 0 \\ 0 & \exp(i2\pi d/\lambda) \end{pmatrix}$ | $\bar{I} \exp(i2\pi d/\lambda)$ |
| Mirror | $\bar{J}_M$ | $\begin{pmatrix} 1 & 0 \\ 0 & 1 \end{pmatrix}$ | $\bar{Q}$ |
| Wire grid (ref.) | $\bar{J}_{WR}$ | $\begin{pmatrix} \cos^2\theta & \sin\theta\cos\theta \\ -\sin\theta\cos\theta & \sin^2\theta \end{pmatrix}$ | $(\bar{Q} + \bar{I}\cos2\theta + i\bar{V}\sin2\theta)/2$ |
| Wire grid (trans.) | $\bar{J}_{WT}(\theta)$ | $\begin{pmatrix} \sin^2\theta & -\sin\theta\cos\theta \\ -\sin\theta\cos\theta & \cos^2\theta \end{pmatrix}$ | $(\bar{I} + \bar{Q}\cos2\theta - \bar{U}\sin2\theta)/2$ |
| Coord. rotation | $\bar{R}(\theta)$ | $\begin{pmatrix} \cos\theta & \sin\theta \\ -\sin\theta & \cos\theta \end{pmatrix}$ | $\bar{I}\cos\theta + i\bar{V}\sin\theta$ |
| Rooftop Mirror | $\bar{J}_{RT}(\theta)$ | $\begin{pmatrix} \cos2\theta & \sin2\theta \\ -\sin2\theta & \cos2\theta \end{pmatrix}$ | $\bar{I}\cos2\theta + i\bar{V}\sin2\theta$ |
| Biref. plate | $\bar{J}_{WP}(\theta, \xi)$ | $\begin{pmatrix} \cos\xi - i\sin\xi\cos2\theta & -i\sin\xi\sin2\theta \\ -i\sin\xi\sin2\theta & -\cos\xi - i\sin\xi\cos2\theta \end{pmatrix}$ | |

Initially, a model is derived for the simple case of a variable-delay polarization modulator at an angle of forty-five degrees. This simple model is then generalized via similarity transformation.

§III(a). Mueller Matrix Representation of a Single Stage

For the simple case, the Jones matrix $\bar{J}_{VPM}(\pi/4)$ representing this configuration can be expressed as a sum of Jones Defining $\Delta \equiv 4\pi(d_1-d_2)/\lambda$ and setting $\xi \equiv \Delta/2$, Eq. (5) follows:

$$\bar{J}_{VPM}(\pi/4, \xi) = \frac{\exp(i2\pi(d_1+d_2)/\lambda)}{2} \begin{pmatrix} \cos(\xi) & -i\cos(\xi) \\ i\sin(\xi) & -\cos(\xi) \end{pmatrix}. \tag{5}$$

Eq. (5) forms a basis for derivation of an expression descriptive of a variable-delay polarization modulator 200 placed at an arbitrary angle $\theta$. The definition of $\theta$ describes the angle of the grid 215 with respect to $\overline{H}$ for the input radiation. To form this description, the coordinate system is transformed into the coordinate system used for the analysis above, the transformation for $\overline{J}_{VPM}(\pi/4)$ is applied, and then the coordinate system is transformed back. However, reflections present a subtlety. For an odd number of reflections, the angle $\theta$ of the device from the perspective of the outgoing beam is the negative of that from the perspective of the incoming beam. This aspect is included as shown below. Setting $\chi=(\theta-\pi/4)$, the description as stated in Eqs. (6) and (7) is provided:

$$\overline{J}_{VPM}(\chi, \xi) = \overline{R}(-\chi)\overline{J}_{VPM}(\pi/4)\overline{R}(\chi) = \frac{\exp(i2\pi(d_1+d_2)/\lambda)}{2} \quad (6)$$
$$\begin{pmatrix} \cos(\xi)+i\sin(\xi)\cos(2\chi) & -i\sin(\xi)\cos(2\chi) \\ i\sin(\xi)\cos(2\chi) & -\cos(\xi)+i\sin(\xi)\sin(2\chi) \end{pmatrix},$$

and $$\overline{J}_{VPM}(\theta, \xi) = \exp(i2\pi(d_1+d_2)/\lambda) \quad (7)$$
$$\begin{pmatrix} \cos(\xi)-i\sin(\xi)\cos(2\theta) & -i\sin(\xi)\cos(2\theta) \\ i\sin(\xi)\cos(2\theta) & -\cos(\xi)-i\sin(\xi)\sin(2\theta) \end{pmatrix}.$$

In terms of the Stokes parameter basis set, this expression is as shown below in Eq. (8):

$$\overline{J}_{VPM}(\theta, \xi)=\exp(i2\pi(d_1+d_2)/\lambda)[\overline{Q}\cos(\xi)-i\sin\xi(\overline{I}\cos(2\theta)+i\overline{V}\sin(2\theta))]. \quad (8)$$

Aside from a phase factor (irrelevant in measuring power), $\overline{J}_{VPM}=\overline{Q}\overline{J}_{WP}$. Accordingly, the action of the variable-delay polarization modulator 200 is equivalent to that of a birefringent plate (having its birefringent axis oriented at angle $\theta$, with a delay $\Delta=2\xi$) followed by a reflection (represented as the Jones matrix $\overline{Q}$).

The matrix in Eq. (8) is unitary and has a determinant of $-1$. Thus its Mueller representation is expected to describe the symmetries of the Poincaré sphere. By expanding the density matrices in the Pauli matrix basis both before and after performing similarity transformations corresponding to the optical system, the Mueller matrix for the system is determined, as shown below in Eq. (9):

$$\overline{M}_{VPM}(\theta, \Delta) = \quad (9)$$
$$\begin{pmatrix} 1 & 0 & 0 & 0 \\ 0 & \cos^2 2\theta+\cos\Delta\sin^2 2\theta & -\sin 2\theta\cos 2\theta(1-\cos\Delta) & \sin 2\theta\sin\Delta \\ 0 & \sin 2\theta\cos 2\theta(1-\cos\Delta) & -\sin^2 2\theta-\cos\Delta\cos^2 2\theta & -\cos 2\theta\sin\Delta \\ 0 & \sin 2\theta\sin\Delta & \cos 2\theta\sin\Delta & -\cos\Delta \end{pmatrix}.$$

The matrix shown in Eq. (9) may be expressed as a product of symmetry operations on the Poincaré sphere, as given below in Eq. (10):

$$\overline{M}_{VPM}(\theta, \Delta) = \Gamma_{QV}\Gamma_{QU}\overline{R}_V(2\theta)\overline{R}_Q(\Delta)\overline{R}_V(-2\theta) \quad (10)$$
$$= \Gamma_{QV}\Gamma_{QU}\overline{M}_{WP}(\theta, \Delta).$$

Here, $\Gamma_{QV}$ represents a reflection about the Q–V plane, $\Gamma_{QU}$ $\Gamma_{QV}$ represents a reflection about the Q–U plane, $\overline{R}_V$ represents a rotation about the V-axis, and $\overline{R}_Q$ represents a rotation about the Q-axis. The matrix $\overline{M}_{VPM}(\theta, \Delta)$ is the Mueller matrix for a wave plate.

§III(b). Polarization Modulation

It is assumed for purposes of this nonrestrictive example that the detector at the back end of the optical system is sensitive to Stokes Q. This is a statement about the orientation of the analyzer in the polarimetric system. Strictly speaking, a Q-sensitive detector requires a differencing of two orthogonal linearly polarized detectors with an orientation that we choose to define as the Q-axis. However, the model developed below is applicable to the class of polarization detector strategies that collect only one linear polarization. Such detectors are technically sensitive to Q±I, but to lowest order, or in ideal modulation, I does not couple to the polarization modulation.

The modulator changes the polarization state of the detector as projected onto the sky. For a single variable-delay polarization modulator, the polarization state that the detector measured can be calculated from the second column of the Mueller matrix, as shown below in Eq. (11):

$$Q_{det}=Q_{sky}(\cos^2 2\theta+\cos\Delta\sin^2 2\theta)+U_{sky}\cos 2\theta\sin 2\theta(1-\cos\Delta)+V_{sky}(\sin 2\theta\sin\Delta). \quad (11)$$

For a variable-delay polarization modulator, $\theta$ is fixed and $\Delta$ is modulated. Using a single variable-delay polarization modulator, it is not possible to completely modulate Q, U and V. An example of this might be obtained by setting $\theta$ to $\pi/4$. In this case, the expression of Eq. (12) is applicable:

$$Q_{det}=Q_{sky}\cos\Delta+V_{sky}\sin\Delta. \quad (12)$$

Here, Q and V are modulated, but U is not. This obtains as a result of the fact that at this grid 215 angle, U and −U propagate through the system separately, without interfering.

An advantage of the variable-delay polarization modulator is that the phase freedom allows a straightforward method for calculating Q and V across large frequency bands. A convenient definition set is: $\Delta \equiv k\delta$, such that $k=2\pi/\lambda$, where $\delta$ represents the total path length difference between two orthogonal polarizations (for traditional Martin-PuplettPupplet beam paths $\delta=2(d_2-d_1)$). The spectrum measured by the polarized detector is then dependent on $\delta$ and is given by Eq. (13) below:

$$Q'(k, \delta)=Q(k)\cos(k\delta)+V(k)\sin(k\delta). \quad (13)$$

For bolometric detectors, the signal is integrated over the passband of the instrument, $\phi(k)$, as described in Eq. 14:

$$Q'(\delta) = \int_0^\infty Q'(k', \delta)\phi(k')dk' = \quad (14)$$
$$\int_0^\infty [Q'(k')\cos(k'\delta) + V(k')\sin k'\delta]\phi(k')dk'.$$

Taking the Fourier transform of both sides of Eq. (14) yields Eq. (15):

$$1/2[Q(k)+iiV(k)]\phi(\lambda) = 1/2\pi \int_{\delta_1}^{\delta_2} Q'(\delta)e^{ik\delta}d\delta. \quad (15)$$

The real part of the Fourier transform of the interferogram is the spectrum of Stokes Q from the source, while the imaginary part is the Stokes V spectrum. Note that broadband modulation relies on sampling a large enough range of path length differences.

For implementation of a Fourier Transform Spectrometer via a Martin-Puplett interferometer, a horizontal or vertical grid 215 is placed at the input port of the device 200. The input polarization state is then purely Q, enabling the internal grid 215 to function as a broadband, frequency-independent beamsplitter. This is equivalent to shorting one of the input ports. Thus, assuming that the polarization of the source is small, $$Q(k) = 1/2(I(k)),$$

and Eq. (15) reduces to the unpolarized spectrum of the source 103. In this case, the device 200 does not measure polarization, but relies on the fact that the input grid 215 is fixing the polarization to something that is known.

A disadvantage to this architecture is its insensitivity to Stokes U. For experiments using space-borne measurement platforms, U can be recovered by rotation of the spacecraft. For experiments using terrestrial measurement platforms, sufficient rotation is problematic, and other techniques may be required.

An alternative to measurement platform rotation is to cascade two instruments 200 serially. The functional form of the polarization signal may be found by simply chaining the two Mueller matrices together.

The transfer equation of the system is now $\overline{S}_{sky} = \overline{M}_{VPM}(\theta_1, \Delta_1)\overline{M}_{VPM}(\theta_2, \Delta_2)\overline{S}_{det}$, where modulator$_2$ is closer to the detector than modulator$_1$. Because the $Q_{det}$ detectors are sensitive only to Q, we solve for the second column of the resulting matrix, shown below in Eq. (16):

$$Q_{det} = Q_{sky}[(\cos^2 2\theta_1 + \cos \Delta_1 \sin^2 2\theta_1)(\cos^2 2\theta_2 + \cos \Delta_2 \sin^2 2\theta_2) - \sin 2\theta_1 \cos 2\theta_1 \sin 2\theta_2 \cos 2\theta_2)(1 - \cos \Delta_1)(1 - \cos \Delta_2) + \sin 2\theta_1 \sin 2\theta_2 \sin \Delta_1 \sin \Delta_2] + U_{sky}[\sin 2\theta_1 \cos 2\theta_1 (1 - \cos \Delta_1)(\cos^2 2\theta_2 + \cos \Delta_2 \sin^2 2\theta_2) - (\sin^2 2\theta_1 + \cos \Delta_1 \cos^2 2\theta_1) \sin 2\theta_2 \cos 2\theta_2 (1 - \cos \Delta_2) - \cos 2\theta_1 \sin 2\theta_2 \sin \Delta_1 \sin \Delta_2] + V_{sky}[\sin 2\theta_1 \sin \Delta_1(\cos^2 2\theta_2 + \cos \Delta_2 \sin^2 2\theta_2) + \cos 2\theta_1 \sin 2\theta_2 \cos 2\theta_2 \sin \Delta_1(1 - \cos \Delta_2) - \sin 2\theta_2 \cos \Delta_1 \sin \Delta_2].$$

(16)

A specific case, given by way of example, where $\theta_1 = \pi/8$ and $\theta_2 = \theta/4$, is now considered. These angles are chosen to allow full sampling of the Poincaré sphere. Polarized sensitivities for selected pairs of phase delay settings for the pair of modulators are shown in Table II. Here it is possible to fully characterize the polarization state, and a simple method for doing this is to adopt a single phase delay over the entire bandwidth. In this case, the modulators are set to the desired detector polarization sensitivity and a measurement is made. The measurement is repeated for each state, thus building up information about the polarization state of the source.

TABLE II

Mapping of $Q_{det}$ onto the sky, corresponding to selected values of $\Delta_1$ and $\Delta_2$ for dual modulators having $\theta_1 = \pi/8$ and $\theta_2 = \pi/4$.

| $\Delta_1$ | $\Delta_2$ | $Q_{det}$ |
|---|---|---|
| 0 | 0 | $Q_{sky}$ |
| 0 | π | $-Q_{sky}$ |
| π | 0 | $U_{sky}$ |
| π | π | $-U_{sky}$ |
| 0 | π/2 | $-V_{sky}$ |
| π/2 | 0 | $\frac{1}{2}(Q_{sky} + U_{sky}) + V_{sky}/\sqrt{2}$ |
| π/2 | π | $-\frac{1}{2}(Q_{sky} + U_{sky}) - V_{sky}/\sqrt{2}$ |
| π | π/2 | $V_{sky}$ |
| π/2 | π/2 | $(Q_{sky} - U_{sky})/\sqrt{2}$ |

One of the strengths of this modulator is an ability to modulate quickly between different polarization states, in turn providing a benefit by putting the polarization signal above the 1/f knee of the instrument noise spectrum. It may also be possible to extend the bandwidth in a way similar to the single modulator above. As a result, it is possible to scan these modulators through a range of delays and thus extract the frequency-independent Stokes parameters.

§III(c). Other Implementations

The architecture exemplified via the illustration of FIG. 2 is not a unique implementation of a variable-delay polarization modulator. Several different arrangements of grids 215 and mirrors correspond to Jones matrices that differ only by an absolute phase from those that describe the Martin-Puplett interferometer as derived above. A simple example uses a polarizing grid 215 placed in front of a mirror. This design is similar in structure to a reflecting waveplate, but, in this design, modulation occurs via modulating the grid 215-mirror spacing, rather than by spinning the device. This alternative design for a polarizing interferometer has been previously employed because it provides compact features and is relatively easy to construct. This implementation is useful in a dual modulator system application because it requires significantly less space in the optical path than many other systems need. However, it does present several drawbacks, including at least: (i) an inability to achieve a zero path length condition results in a slight decrease in effective bandwidth; and (ii) the two polarizations on the output side are slightly displaced. This effect may be mitigated slightly by using the modulators at close to normal incidence and by placing the modulators as close as possible to an aperture/pupil.

§III(d). Systematics

In developing a polarization modulator, one must consider the possibility of instrumental effects introduced by the action of the modulation. In a dielectric half-wave plate, such an effect arises from the absorption properties of a birefringent material. Loss tangents for light polarized along the fast and slow axes are generally different. The result is a modulated signal that appears at twice the rotational frequency of the birefringent plate. For the dual variable-delay polarization modulator system, there are two important effects to consider, as follows: (i) different settings of the translational stage result in changes in edge illumination, potentially introducing a spurious polarization signal; and (ii) differential absorption by the grids 215 and the mirrors 207, 212 of the modulator 200. One of these concerns may be obviated by restricting the use of such modulators to slow optical systems in which the beam growth through the modulator is minimal. Another of these concerns is mitigated via use of rooftop mirrors (e.g., rooftop mirrors 207, 212), where the angle of incidence is the same, for different modulator portions. Thus, the Fresnel coefficients for each of the two polarizations remains essentially constant during the modulation process.

§III(e). Experimental Results

The description of experimental results comprises four parts. In part (i), the setup is described. In part (ii), experimental procedures are explained. In part (iii), experimental results are described. In part (iv), resonances are considered.

(i) Setup

Figure 4:
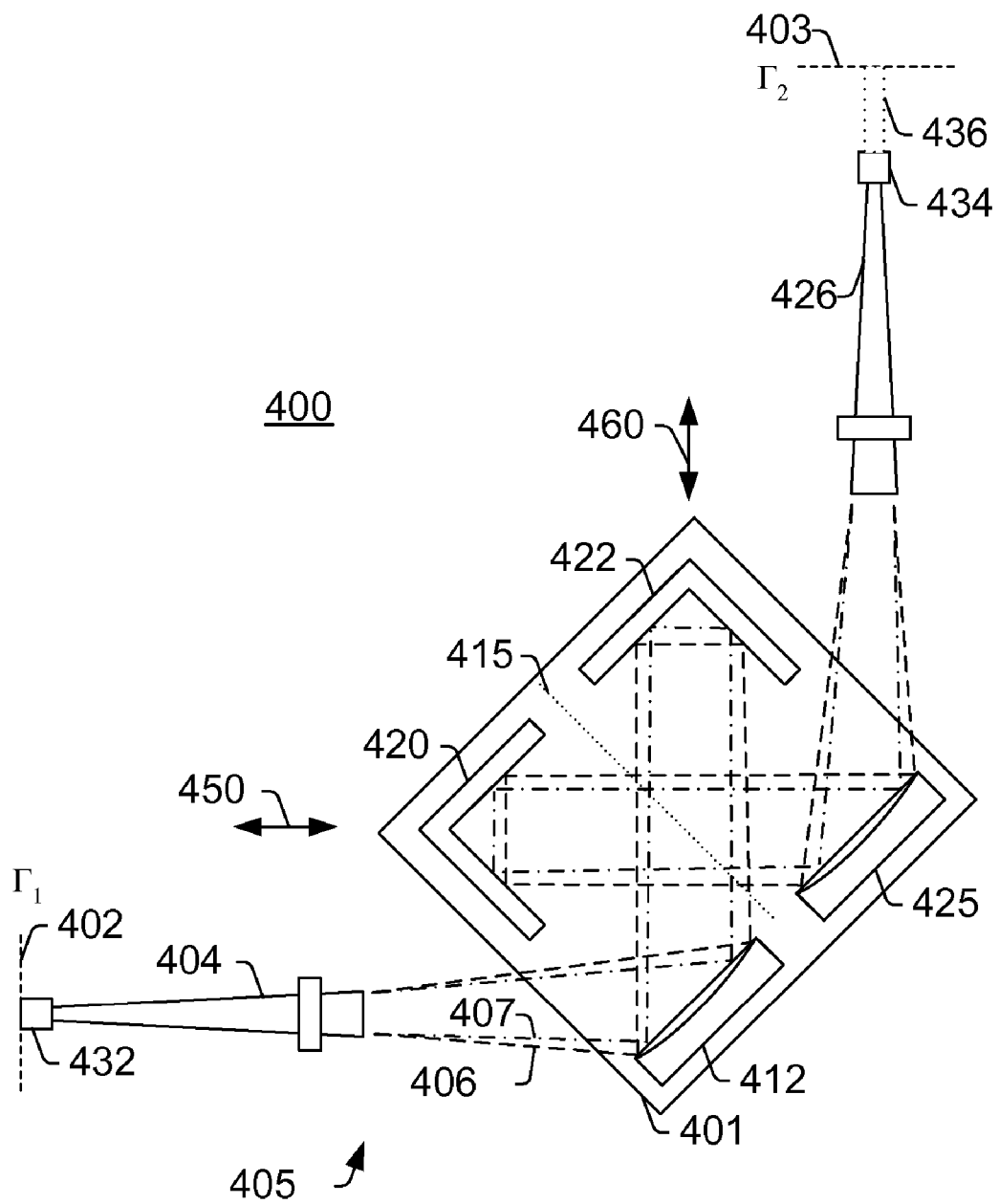
FIG. 4 is a simplified block diagram illustrating a variable-delay polarization modulator useful in the context of the system of FIG. 1 according to an embodiment.

FIG. 4 shows a simplified block diagram 400 illustrating a variable-delay polarization modulator 401 useful in the context of the system 100 of FIG. 1. The example of the embodiment provided in FIG. 4 also is helpful in testing and evaluating performance of the polarization modulation of a test vehicle exemplifying the principles of operation of a Martin-Puplett interferometer in the context of the disclosed subject matter.

In the block diagram 400 of FIG. 4, the modulator 401 is shown as having an input port 402 (having a reference plane labeled $\Gamma_1$), and an output port 403 (having a reference plane labeled $\Gamma_2$). The input port 402 is 302 may be coupled to a feedhorn 404304, which, in turn, may provide a signal 405 (analogous to the signal 102 of FIG. 1) to the modulator 402, where the signal 405 has polarization elements 406 (dashed line) and 407 (dot-dashed line) associated therewith.

The beam 405 exiting the horn 404 attached to the input port one 402302 subsequently can be redirected via a reflective element 412 and then can pass through a polarizing grid 415 that has its wires oriented at a forty-five degree angle in projection. Each orthogonal polarization 406, 407 is 306, 307 can then be launched down a separate arm of the device 401301 and reflect off of one of two rooftop mirrors 420, 422, each of which rotates the polarization vector by ninety degrees, as shown above with reference to FIG. 2. The beams may recombine at the polarizer 415 and may be refocused via a second reflective element 425 into a second feed horn 426326 which may be coupled to port two 404.

The experimental setup is shown as being symmetric, and so the reverse light path is identical. The rooftop mirrors 420, 422 are 320, 322 may be placed on translational stages (not illustrated), such that their relative distance (i.e., $d_1$ and $d_2$ as noted in FIG. 2) may be adjusted. The frequency-dependent phase that corresponds to this path length difference is the parameter that determines the mapping between polarization states on either end of the device 401. Note that the system can support ~1 mode in each polarization. As a result, Gaussian analysis was used in designing the optics.

From a microwave circuit perspective, this device 401 may be modeled as a four-port device, with the two ports 402, 404 on either end of the device 401 being defined as the vertically and horizontally polarized electric field modes. In these experiments, a Hewlett-Packard HP8106D millimeter wave vector network analyzer (hereinafter "VNA") (not illustrated) was used to measure scattering parameters between these modes. The calibration reference planes are shown ($\Gamma_1$ 1 and $\Gamma_2$) in FIG. 4. The VNA may be used to measure the two by two scattering matrices of pairs of these ports, so in order to reduce contamination of results, a respective orthomode transducer (hereinafter "OMT") 432, 434 was placed at the back of each respective feedhorn 404, 426 and terminates the unused polarization with a matched load.

For purpose of these measurements, it is useful to regard the end of the feedhorn 404 attached to one port of the VNA as the source (analogous to the source 103 of FIG. 1) and that attached to another port of the VNA as the detector. The polarization state of the source for the measured data (presented infra with respect to FIGS. 5 through 9) was set to be vertically-polarized light (a pure Q state), by orienting the waveguide appropriately. On the detector side (i.e., corresponding to the second port 403), both V and H states were quantified in successive measurements by respectively omitting and adding a ninety-degree twist to the WR-10 waveguide between the OMT 434 and the $\Gamma_2$ calibration point 403. The loss of the twist 436 is measured as 0.15 dB. The calibrated difference between the power associated with H and V gives a measurement of Stokes Q at the detector.

The bandwidth of the test setup is approximately 78-115 GHz. At the low end of the band, the band edge is defined by that of the W-band feed horns 404, 426, and at the high end, it is defined by return loss due to the OMTs 432, 434.

The experimental data presented via FIGS. 5 through 9, as described in §III(f), infra, employ a pair of W-band feed horns 404, 426 (25-27 dBi) that are collimated by ellipsoidal mirrors 412, 425 (f=25 cm). Each of the two rooftop mirrors 420, 422 reflect 320, 322 reflects a component of polarizations. The mirrors are mounted on transports employed to adjust the path lengths of the individual polarizations. The polarizing grid is mounted such that the wires make an angle of forty-five degrees with the roof lines of (i.e., lines between corresponding or opposed points on the surfaces of) the rooftop mirrors 412, 425 in projection. The dashed and dotted lines show positions of the beam radius (8.7 dB edge taper and 20 dB edge taper, respectively) of a Gaussian beam propagating through the structure for a 26 dBi feed and a wavelength of three millimeters (100 GHz). A dotted outline illustrates location for a ninety degree twist 436 that converts the sensitivity of port two from V to H.

(ii). Experimental Procedure

The zero path length position is found by first measuring the signal in the V direction at an experimental condition where the $S_{21}$ parameter was flat across the band. A first null condition was then used to achieve fine adjustment. V and H were measured for twenty-seven combinations of positions of the two mirrors (i.e., such as the rooftop mirrors 207, 212 of FIG. 2 or 420, 422 of FIG. 4) having path differences (e.g., such as $d_1-d_2$) corresponding to twenty-four degree steps in phase for $\lambda$=3 mm. FIGS. 5 through 8 show four measured spectra. These plots include the expected transmission spectra (H $\alpha(1-\cos \Delta)$ and V $\alpha(1+\cos \Delta)$), adopting a global gain of 0.9 dB to account for the expected loss beyond the calibration port. The return loss of the system is about twenty-six dB and can been seen in the H component in FIG. 4. The transmission efficiency of the horns 404, 426 used here is not constant across the band, and tends to roll off at low frequencies.

(iii). Experimental Results

The experimental setup is described mathematically by Eq. (12). In this case, $$Q_{det} = (H(\Delta) - fV(\Delta))/(H(\Delta) + fV(\Delta)) \qquad (17)$$
$$= Q_{source}\cos\Delta + V_{source}\sin\Delta,$$

where $\Delta=4\pi(d_2-d_1)/\lambda$. Here, H($\Delta$) and V($\Delta$) are the powers corresponding to $S_{21}$ when the twist is included and excluded, respectively. For each frequency, the relative gain factor, f, is calculated by fitting for the average values of the signals in the H and V configurations and then taking the ratio.

Figure 7:
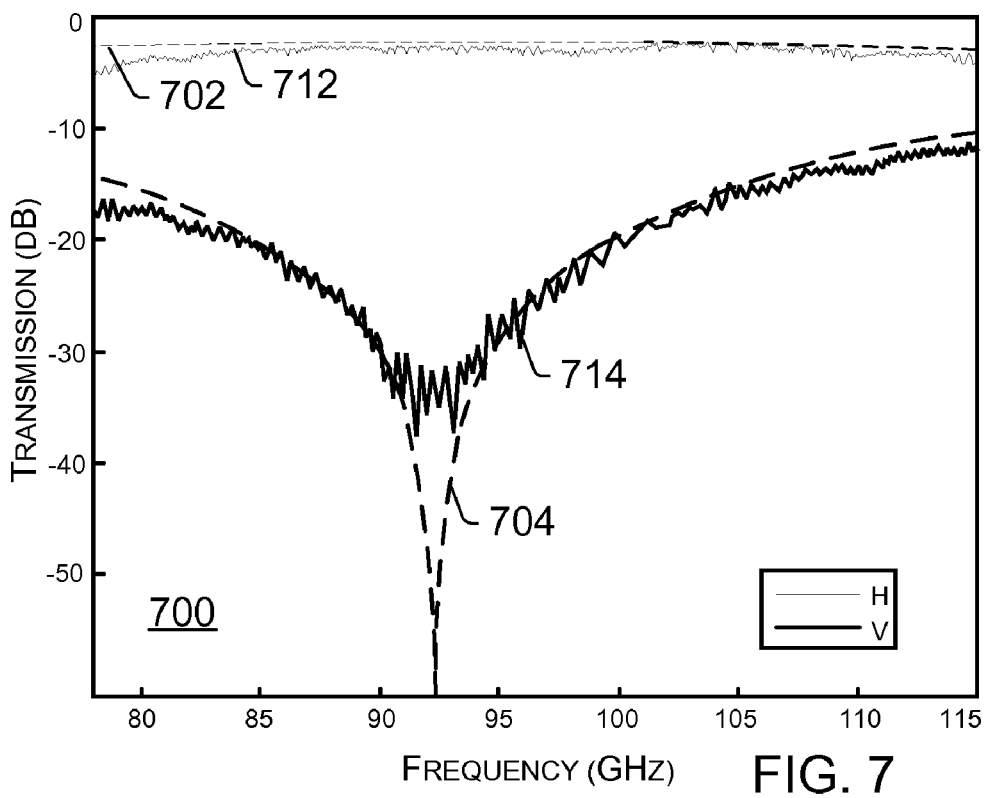

For every frequency, it is possible to measure Stokes Q and V. The result of this analysis is shown in FIG. 7. We find that that average Stokes parameters measured over the 78-110 GHz band are Q=−1.002±0.003 and V=0.001±0.013. There is some non-zero power in Stokes V near the high end of the band. It is unclear whether this is due to a systematic effect, or to an unknown source polarization.

(iv). Resonances

In this setup, proper termination of the unused port at both the entrance (202, 402) and exit (204, 403) apertures is essential, as even small reflections can introduce resonances. These resonances are an indication of level of uncertainty of phase control of the radiation propagating through the device 200, 300, 400. In turn, such uncertainty leads directly to a frequency-dependent random mixing between the Q and V polarization states, and hence to a decrease in the precision of the Martin-Puplett interferometer as a polarimeter.

To address such factors, it is noteworthy that systematic "noise" may be mitigated via various levels of termination of the unused polarization. For example, addition of the OMTs 432, 434 in the signal chain reduced noise in the transmission from three dB to one dB. This setup also employed a conventional horizontal grid (not illustrated), analogous to grid 215, 315, 415, at the mouth of the appropriate feedhorn 404, 426 to redirect any residual H component to a conventional eccosorb beam dump (also not illustrated). Such reduced the noise in transmission to one-fourth dB and further reduced the average coupling Q into V from four percent to under one percent.

On a telescope, this problem is mollified by the fact that the source 103 component is nearly perfectly terminated in the sky. This greatly reduces phase uncertainties in the system, as well as need for excessive polarization filtering.

An additional consideration is that the ability of these variable-delay polarization modulator devices 200, 300, 400 to operate at room temperature also favors application as calibration devices. An input polarized signal is easily transformed to test polarization response of a precision polarization sensor. These variable-delay polarization modulator devices 200, 300, 400 are capable of transforming an initially linearly polarized state into an elliptical polarization state.

§III(f). Experimental Results vs. Simulations

FIGS. 5 through 9 summarize experimental results obtained as described above with respect to §§(i) through (iv). The thick solid line in each of these graphical depictions represents the spectrum of the vertical (V) linear polarization as measured at port two of the vector network analyzer. The thin solid line accompanying this represents the spectrum of the corresponding horizontal (H) linear polarization, also measured at port two of the vector network analyzer. The H polarization component is measured by adding a ninety-degree twist in the WR-10 waveguide attached to port two of the VNA. Predictions for H and V provided via the theory and models discussed above are plotted as thick and thin dashed lines, respectively. FIGS. 5 through 8 employ axes calibrated in decibels (dB, ordinate), and frequency, expressed in gigaHertz (abscissa).

Figure 5:
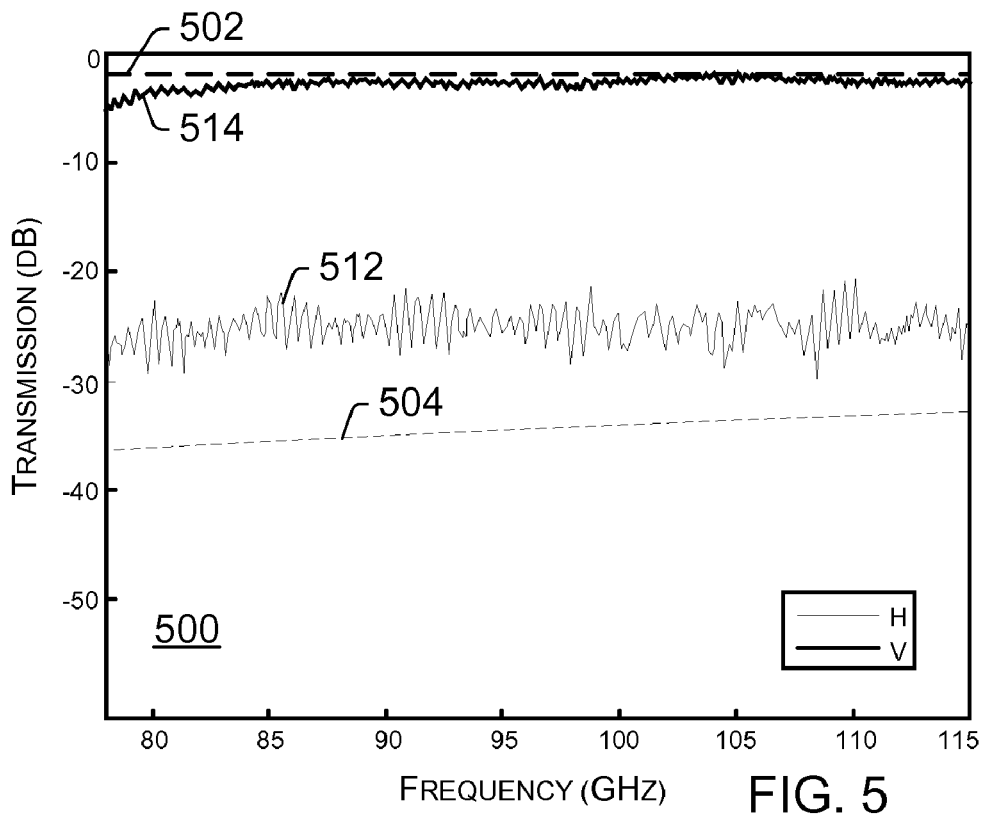
FIGS. 5 through 9 are graphical depictions of measured and simulated performance of a millimeter-wave or quasi-optical signal detection apparatus using the concepts developed with respect to the variable-delay polarization modulator element(s) according to an embodiment.

FIG. 5 provides a graph 500 of signal transmission amplitudes in comparison to respective predicted expectation values 502, 504 for horizontal (H) 512 and vertical (V) 514 polarization components of a signal (e.g., signal 102 of FIG. 1). The relative separation $d_1-d_2$ of the rooftop mirrors 420, 422 (FIG. 4) for the data displayed in FIG. 5 is a negative thirteen micrometers.

Figure 6:
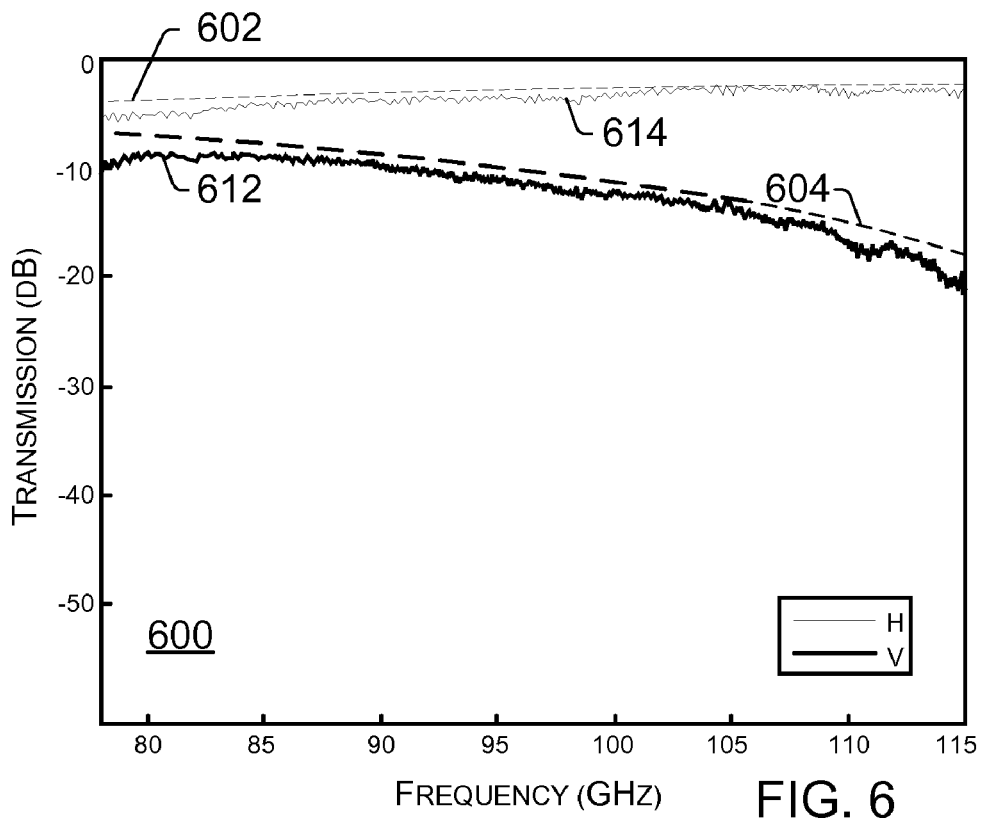

FIG. 6 provides a graph 600 of signal transmission amplitudes in comparison to estimated values 602, 604 for respective horizontal (H) 612 and vertical (V) 614 polarization components of the signal of FIG. 6. The relative separation $d_1-d_2$ of the rooftop mirrors 420, 422 (FIG. 4) for the data displayed in FIG. 6 is five hundred thirteen micrometers.

FIG. 7 provides a graph 700 of signal transmission amplitudes in comparison to estimated values 702, 704 for respective horizontal (H) 712 and vertical (V) 714 polarization components of the signal of FIG. 7. The relative separation $d_1-d_2$ of the rooftop mirrors 420, 422 (FIG. 4) for the data displayed in FIG. 7 is a negative one thousand thirteen micrometers.

Figure 8:
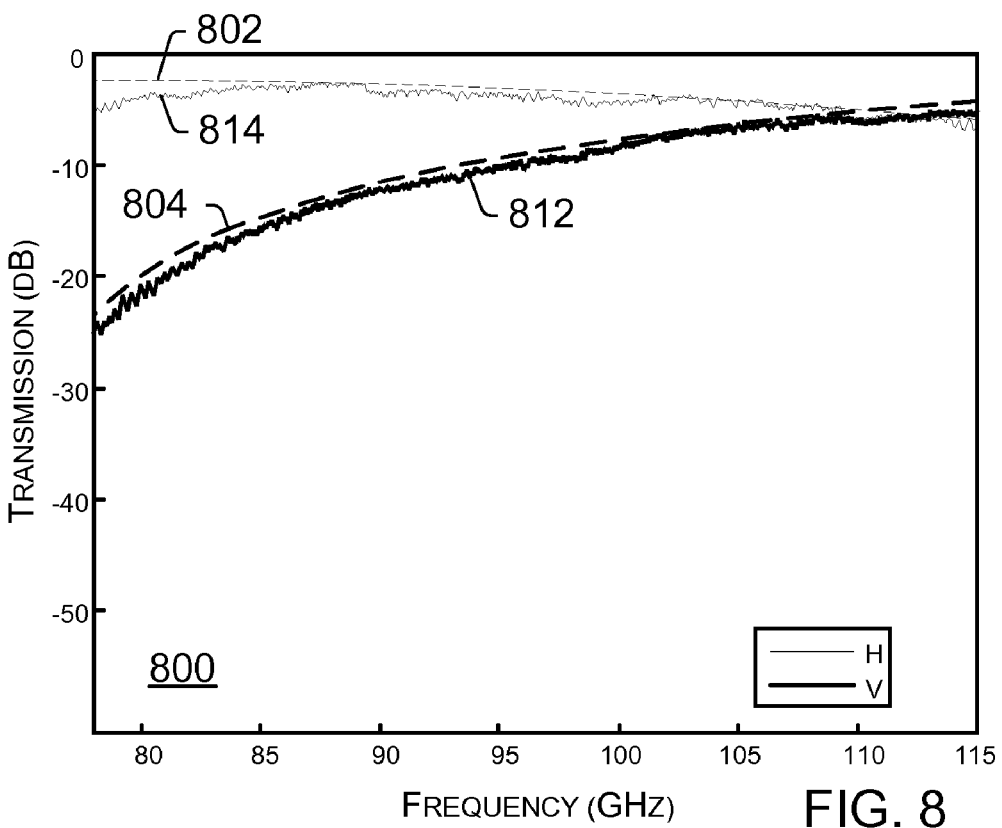

FIG. 8 provides a graph 800 of normalized Stokes parameters Q 802, 804 for respective horizontal (H) 812 and vertical (V) 814 polarization components of the signal of FIG. 8. The relative separation $d_1-d_2$ of the rooftop mirrors 420, 422 (FIG. 4) for the data displayed in FIG. 8 is a negative one thousand thirteen micrometers.

Figure 9:
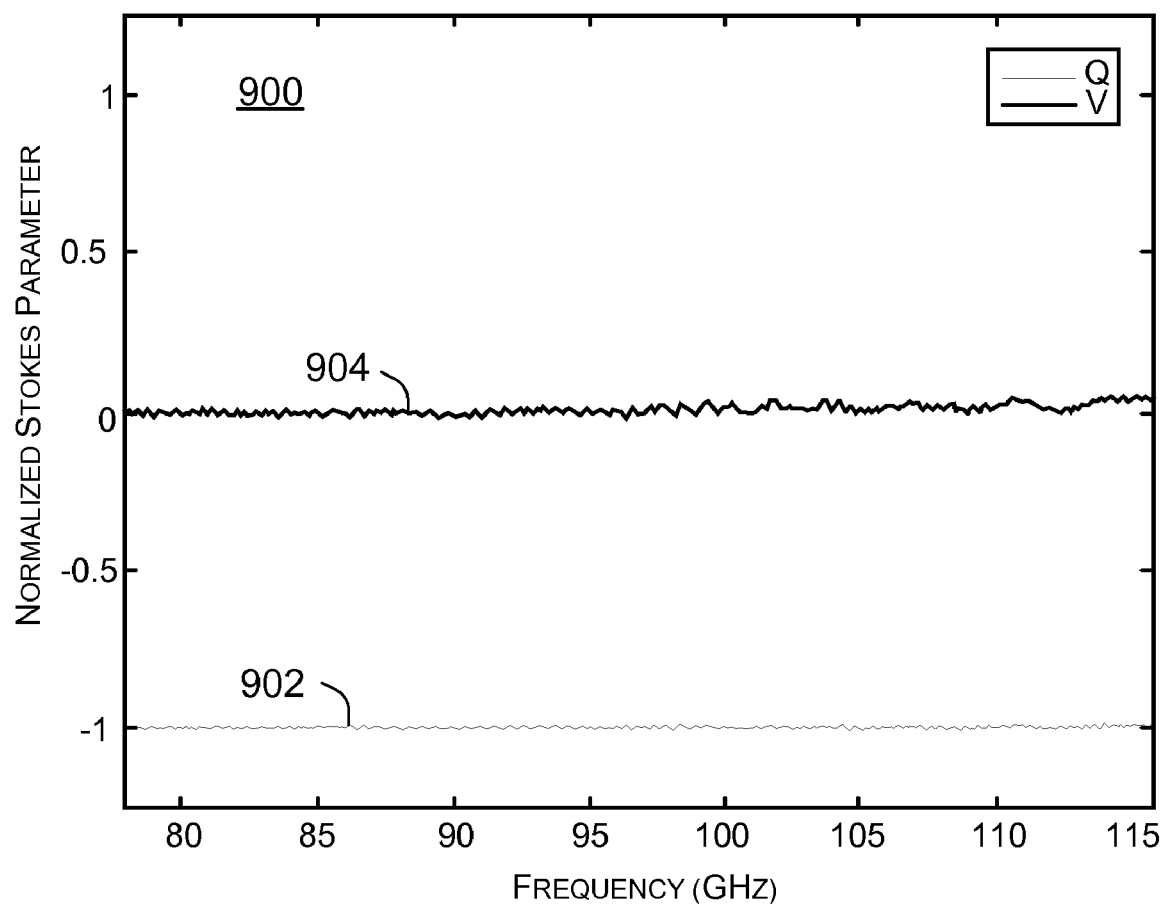

FIG. 9 provides a graph 900 of normalized Stokes parameters Q 902 and V 904 as a function of frequency, by fitting to the twenty-seven positions for the rooftop mirrors 420, 422 of FIG. 4. Mean values for Q 902 and V 904 across the seventy-eight to one hundred fifteen GHz band are −1.002±0.003 and 0.001±0.013, respectively.

§III(g). Polarization Matrix Methods

The overview of polarization matrix methods is developed in three parts. In part (i), Jones matrices are described. In part (ii), density matrices are described. In part (iii), Mueller matrices are described.

(i). Jones Matrices

Jones matrices provide convenient modeling tools for analysis of radiation as it propagates through an optical system in which knowledge of phase is relevant. For an ideal case, it is assumed that all ports are impedance matched, and so no cavities are formed. This formulation is applicable for coherent radiation; however, it may be extended using the closely-related formalism of density matrices to treat situations involving partially-polarized radiation or light.

Jones matrices are two by two matrices expressing information regarding how orthogonal electrical field components transform in an optical system. The input Jones vector is expressed as shown below in Eq. (18):

$$|E\rangle = \begin{pmatrix} E_x \\ E_y \end{pmatrix} \equiv \begin{pmatrix} E_H \\ E_V \end{pmatrix}. \tag{18}$$

The output vector from an optical system may then be represented by $|E_f\rangle = \bar{J}|E_i\rangle$, where $\bar{J}$ is the vector transformation introduced by the optical system. The power measured at a detector at the back end of such a system may be expressed as shown in Eq. (19), below:

$$\langle E_f|\bar{J}_{det}|E_f\rangle = \langle E_i|\bar{J}^\dagger \bar{J}_{det}\bar{J}|E_i\rangle. \tag{19}$$

The matrix $\bar{J}_{det}$ depends on properties of the detector used to make the measurement. In Jones matrix representation, Stokes parameters are represented by appropriate Pauli matrices and the identity matrix, as shown below:

$$\bar{I} \equiv \bar{\sigma}_0 = \begin{pmatrix} 1 & 0 \\ 0 & 1 \end{pmatrix}; \tag{20}$$

$$\bar{Q} \equiv \bar{\sigma}_1 = \begin{pmatrix} 1 & 0 \\ 0 & -1 \end{pmatrix};$$

$$\bar{U} \equiv \bar{\sigma}_2 = \begin{pmatrix} 0 & 1 \\ 1 & 0 \end{pmatrix};$$

-continued $$V \equiv \overline{\sigma_3} = \begin{pmatrix} 0 & -i \\ -i & 0 \end{pmatrix}.$$

In these representations, the bar over the Stokes symbol indicates the Jones matrix representation. An un-barred Stokes symbol represents measurable power (e.g., $Q=\langle E_j|J_{det}|E_j\rangle$). The measured power in each of the Stokes parameters is given via Eqs. (21) through (24) below:

$$I = \langle E|\overline{I}|E\rangle = E_H^2 + E_V^2; \quad (21)$$

$$Q = \langle E|\overline{Q}|E\rangle = E_H^2 - E_V^2; \quad (22)$$

$$U = \langle E|\overline{U}|E\rangle = 2\Re(E_H^* E_V); \quad (23)$$

$$V = \langle E|\overline{V}|E\rangle = 2\Im(E_H^* E_V). \quad (24)$$

Eqs. (21) through (24) connect the Jones matrix formulation of the Stokes parameters to their familiar definitions. These four Stokes matrices have the following multiplicative properties: if $(\overline{\sigma_0}, \overline{\sigma_1}, \overline{\sigma_2}, \overline{\sigma_3}) \equiv (\overline{I}, \overline{Q}, \overline{U}, \overline{V})$, $\overline{\sigma_0}\overline{\sigma_\alpha} = \overline{\sigma_\alpha}$ $\overline{\sigma_0} = \overline{\sigma_\alpha}$ for $\alpha \in (0, 1, 2, 3)$ and $\overline{\sigma_i}\overline{\sigma_j} = \Sigma_l \epsilon_{jkl} i\overline{\sigma_l} + \delta_{jk}\overline{\sigma_0}$ and for j, k, l $\in$ (1, 2, 3). These four matrices form a convenient basis for expressing Jones matrices.

(ii). Density Matrices

Density matrices are two by two matrices which fully characterize the polarization state of the light. For the general case of partially polarized light, polarization arises because of time-averaged (statistical) correlations between the electric field components. A density matrix $\overline{D}$ is represented as shown below with reference to Eq. (25):

$$\overline{D} = \begin{pmatrix} \langle E_x^* E_x \rangle & \langle E_x^* E_y \rangle \\ \langle E_y^* E_x \rangle & \langle E_y^* E_y \rangle \end{pmatrix}. \quad (25)$$

The brackets < > indicate a time average. When the density matrix is expressed as a linear combination of Pauli matrices, $\overline{D} = I\overline{\sigma_0} + Q\overline{\sigma_1} + U\overline{\sigma_2} + V\overline{\sigma_3}$, the coefficients are the Stokes parameters.

Transformation of the polarization state by an optical system may be described via a similarity transformation, $\overline{D}' = J^\dagger \overline{D} J$. Here, J is the Jones matrix describing the optical system. For the purposes of this disclosure, the manner in which the polarization state of the detectors maps onto the sky is relevant. Accordingly, $\overline{D}_{sky} = J^\dagger \overline{D}_{det} J$. The transformation of the density matrix $\overline{D}$ and the expression for total power in the Jones formalism as expressed in Eq. (19) are notably similar.

(iii). Mueller Matrices

Mueller matrices are four by four matrices. In an analogy to special relativity, the inhomogeneous Lorentz group may be represented by a group of four by four real matrices acting on a Stoke vector, $\overline{S} = (I, Q, U, V)$, and these matrices are known as Mueller matrices.

In the prior discussion, no limitations had been placed on J, the matrix describing the optical system being modeled. When the magnitude of the determinant of J is unity, there is a homomorphism between the group of two by two matrices having |det J|=1 and the Poincaré or inhomogeneous Lorentz group. With respect to the subject matter of this disclosure, the Mueller matrix that maps the Stokes parameters at the detector to the sky are of note, viz., $\overline{S}_{sky} = \overline{MS}_{det}$.

For polarization modulation, the instances for which the Jones matrices describing the optical system are unitary are of interest. For this case, Stokes I decouples from the other Stokes parameters, and the quantity $P^2 = Q^2 + U^2 + V^2$ is preserved. This subgroup may be represented by three by three orthogonal submatrices representing symmetries on the surface of a sphere in space having Stoke I, Q and V as axes. This sphere is the Poincaré sphere.

When the group of density matrices are restricted to those with positive determinants, the system is described by SU(2), and so there is homomorphism between this group and the SO(3) group of rotations on the Poincaré sphere. These are the groups that are important to a wave plate; however, the physical reflection involved in the VPM architecture introduces a negative determinant, resulting in combinations of rotations on the Poincaré sphere.

§III(h). Summary

Techniques for polarization modulation in which n phase delays between linear orthogonal polarizations are placed in series with arbitrary relative orientations as are described and modeled in this disclosure. The n=1 and n=2 cases are specifically considered, and it is noted that for appropriate relative orientations, it is possible to fully modulate the polarization in the n=2 case. In the far-infrared through millimeter where bandpasses are typically $\Delta\lambda/\lambda \sim 0.1$, this device can be used in a similar manner to a half-wave plate. Broader passbands ($\Delta\lambda/\lambda \sim 0.3$) may be accommodated using more complex modulation schemes. This architecture enables construction of a modulator that may be made robust, broadband, and easily tunable to different wavelengths to provide frequency diversity. In addition, it permits complete determination of the polarization state of the incoming radiation by measurement of Stokes Q, U and V.

§V. Conclusion

A polarization sensitive receiver system is described. Although specific embodiments have been illustrated and described herein, it will be appreciated by those of ordinary skill in the art that any arrangement which is calculated to achieve the same purpose may be substituted for the specific embodiments shown. This disclosure is intended to cover any adaptations or variations. For example, although described in procedural terms, one of ordinary skill in the art will appreciate that implementations can be made in a procedural design environment or any other design environment that provides the required relationships.

In particular, one of skill in the art will readily appreciate that the names or labels of the elements and apparatus are not intended to limit embodiments. Furthermore, additional processes and/or apparatus can be added to the components, functions can be rearranged among the components, and new components to correspond to future enhancements and physical devices used in embodiments can be introduced without departing from the scope of embodiments.

What is claimed is:

1. A millimeter wave receiver comprising:

an input antenna;

a polarization modulation chain coupled to the input antenna and comprising a plurality of cascaded variable-delay polarization modulators each including an input having a fixed basis of phase introduction;

a translation apparatus providing variable magnitude of phase delay between two orthogonal linear polarizations of an input signal;

a beamsplitter; and a first arm and a second arm optically coupled to one another via the beamsplitter, each of the first and second arms being formed of opposed reflective elements disposed on opposite sides of the beamsplitter, the opposed reflective elements in each arm including at least one mirror coupled to the translation apparatus such that a first distance separating the beamsplitter from at least one of the opposed reflective elements is variable.

2. The receiver of claim 1, wherein one of each of the opposed reflective elements provides a collimation function.

3. The receiver of claim 1, wherein one of each of the opposed reflective elements is formed as an ellipsoidal mirror and provides a collimation function.

4. The receiver of claim 1, wherein one of each of the opposed reflective elements includes several planar surfaces oriented at right angles in a rooftop configuration and realizing a reflected light path parallel to a path of incident light.

5. The receiver of claim 1, wherein the beamsplitter includes a wire grid.

6. The receiver of claim 1, wherein one of each of the opposed reflective elements is formed as an ellipsoidal mirror and provides a collimation function, another of each of the opposed reflective elements includes several planar surfaces oriented at right angles in a rooftop configuration and realizing a reflected light path parallel to a path of incident light, and wherein the beamsplitter includes a wire grid.

7. The receiver of claim 1, wherein the beamsplitter also functions as a polarizing filter.

8. The receiver of claim 1, wherein the variable-delay polarization modulators are capable of assessing both circular and linear polarization and provide capability for use at multiple wavelengths.

9. A method of characterizing the polarization of a signal comprising:

providing an input antenna;

coupling a polarization modulation chain to the input antenna; said polarization modulation chain comprising a plurality of cascaded variable-delay polarization modulators each including:

an input having a fixed basis of phase introduction;

a translation apparatus providing variable magnitude of phase delay between two orthogonal linear polarizations of an input signal;

a beamsplitter; and a first arm and a second arm optically coupled to one another via the beamsplitter, each of the first and second arms being formed of opposed reflective elements disposed on opposite sides of the beamsplitter, the opposed reflective elements in each arm including at least one mirror coupled to the translation apparatus such that a first distance separating the beamsplitter from at least one of the opposed reflective elements is variable;

receiving a signal via the input antenna; and modulating the signal through the polarization modulation chain to characterize the polarization of the signal.

10. The method of claim 9, wherein one of each of the opposed reflective elements provides a collimation function.

11. The method of claim 9, wherein one of each of the opposed reflective elements is formed as an ellipsoidal mirror and provides a collimation function.

12. The method of claim 9, wherein one of each of the opposed reflective elements includes several planar surfaces oriented at right angles in a rooftop configuration and realizing a reflected light path parallel to a path of incident light.

13. The method of claim 9, wherein the beamsplitter includes a wire grid.

14. The method of claim 9, wherein one of each of the opposed reflective elements is formed as an ellipsoidal mirror and provides a collimation function, another of each of the opposed reflective elements includes several planar surfaces oriented at right angles in a rooftop configuration and realizing a reflected light path parallel to a path of incident light, and wherein the beamsplitter includes a wire grid.

15. The method of claim 9, wherein the beamsplitter also functions as a polarizing filter.

16. The method of claim 9, wherein the variable-delay polarization modulators are capable of assessing both circular and linear polarization and provide capability for use at multiple wavelengths.

* * * * *